US006431231B1

(12) United States Patent
Braaten et al.

(10) Patent No.: US 6,431,231 B1
(45) Date of Patent: Aug. 13, 2002

(54) HYDRAULICALLY CONTROLLED STUMP GRINDER

(75) Inventors: Rae Dell Braaten, Fargo; Paul John Steffes, Dickinson; Juel M. Bautz, Bismarck, all of ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 45 days.

(21) Appl. No.: 09/595,723

(22) Filed: Jun. 16, 2000

(51) Int. Cl.[7] .......................... A01G 23/06; B23Q 15/00
(52) U.S. Cl. .................. 144/24.12; 60/492; 60/431; 91/461; 37/302; 144/356; 144/334; 144/382; 241/101.71
(58) Field of Search .................. 60/414, 428, 430, 60/431, 449, 490, 492; 37/301, 302; 91/436, 447, 448, 449, 461; 137/885; 180/305, 307; 144/24.12, 334, 356, 382; 241/101.72, 101.73, 101.74, 101.75

(56) References Cited

U.S. PATENT DOCUMENTS

| 3,636,977 A | * | 1/1972 | Adams | |
| 3,685,557 A | | 8/1972 | Groce | 144/24.12 |
| RE28,651 E | | 12/1975 | Welborn | 144/24.12 |
| 5,203,615 A | | 4/1993 | Zanetis et al. | 299/39 |
| 5,299,857 A | | 4/1994 | Zanetis | 299/39 |
| 5,435,359 A | | 7/1995 | Craft | 144/334 |
| 5,588,474 A | | 12/1996 | Egging | 144/24.12 |
| 5,655,581 A | | 8/1997 | Craft | 144/24.12 |
| 5,718,271 A | | 2/1998 | Engelhoven | 144/24.12 |
| 5,738,155 A | | 4/1998 | Cochran | 144/24.12 |
| 5,845,689 A | | 12/1998 | Egging et al. | 144/334 |
| 5,957,213 A | | 9/1999 | Loraas et al. | 172/24.12 |
| 6,047,749 A | * | 4/2000 | Lamb | 144/24.12 |

OTHER PUBLICATIONS

Worksaver Advertisement page 3, "Stump Grinder Now Available", published Summer of 1994.

* cited by examiner

Primary Examiner—W Donald Bray
(74) Attorney, Agent, or Firm—Westman, Champlin & Kelly, P.A.

(57) ABSTRACT

The stump grinder has a rotating cutting wheel that is mounted onto an arm for raising and lowering movement and is driven by a hydraulic motor. The arm is capable of being moved about a generally upright axis to control the rate of laterally feed of the cutting wheel. The actuator movement is controlled as a function of the pressure to the hydraulic motor driving the cutting wheel so that as the pressure increases, the rate of feeding movement laterally of the cutting wheel is reduced. The rate of movement is controlled in both directions of swinging of the post about an upright axis, by utilizing variable opening or proportional flow pilot operated valves on the lines to the actuator for controlling the swing. As pressure to the motor increases the variable outlet or proportional pilot operated valve connected to the pressurized end of the swing actuator opens a greater amount diverts a portion of the hydraulic fluid flow to drain to slow movement of the swing actuator.

12 Claims, 5 Drawing Sheets

HYDRAULICALLY CONTROLLED STUMP GRINDER

BACKGROUND OF THE INVENTION

The present invention relates to a stump grinder attachment for a skid steer loader, which is controlled and driven by hydraulic fluid under pressure. The stump grinder has a rotary cutter wheel that is driven by a hydraulic motor, and the load on the cutter wheel causes the pressure in the motor to vary. The cross feed of the cutter wheel across a stump to be removed is controlled by a hydraulic cylinder, and the feed of this cylinder movement is variable as a function of the pressure in the cutter wheel drive motor.

Stump grinders are well known in the art, and all of them use a rotating cutter wheel that will engage a stump or other obstruction that is capable of being cut and then the wheel is swung laterally of the axis of the wheel in order to cut away or chip the stump the wheel is engaging. Many of these stump grinders mount on three point hitches and are driven from power takeoffs of tractors. Others are engine driven and are independent units that mount on wheels and can be transported from one place to another.

The ability to sense engine speed and control the function of a cross feed cylinder for a cutter wheel from a signal which is a function of engine speed of an engine driven wheel is disclosed in U.S. Pat. No. 5,588,474 as well as U.S. Pat. Nos. 6,014,996 and 5,845,689. All of these are related to an internal combustion engine that drives the cutter wheel and will drop in speed as the load on the cutter wheel increases.

SUMMARY OF THE INVENTION

The present invention relates to a stump grinder that has hydraulic drives and controls including a hydraulic drive motor for the cutter wheel, and various control cylinders for adjusting the depth, position, and lateral feed of the stump grinder wheel. The present invention includes a hydraulic circuit that controls the cross feed or swing cylinder which a pressure operated proportional valve that varies the rate of movement of the feed as a function of the pressure of the drive motor. It is a hydraulic pressure function, that controls the lateral feed of the cutter wheel, independent of governed engine speed.

DETAILED DESCRIPTION OF THE ILLUSTRATIVE EMBODIMENTS

Figure 2:
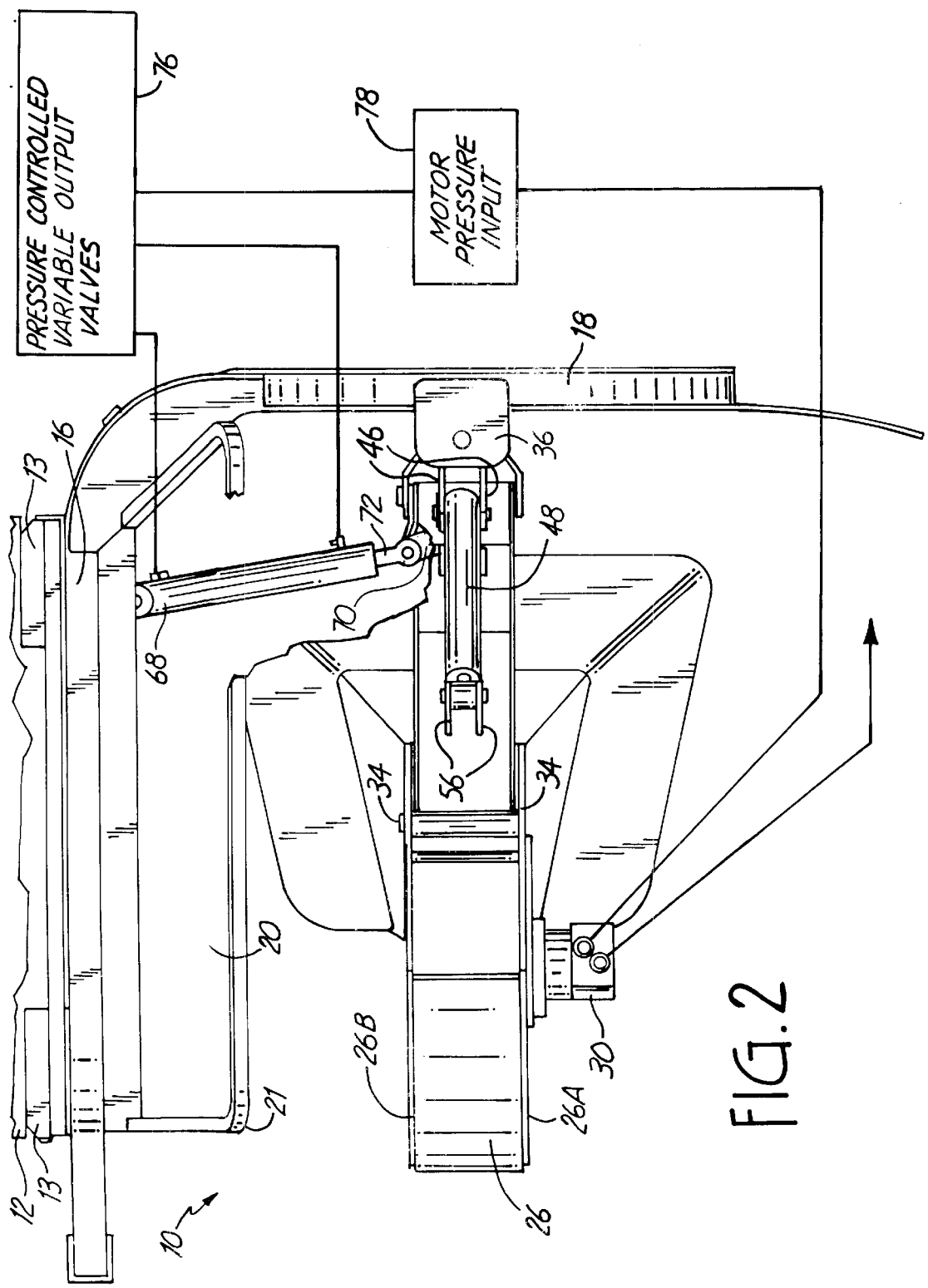
FIG. 2 is a top plan view of the stump grinder of FIG. 1.
Figure 3:
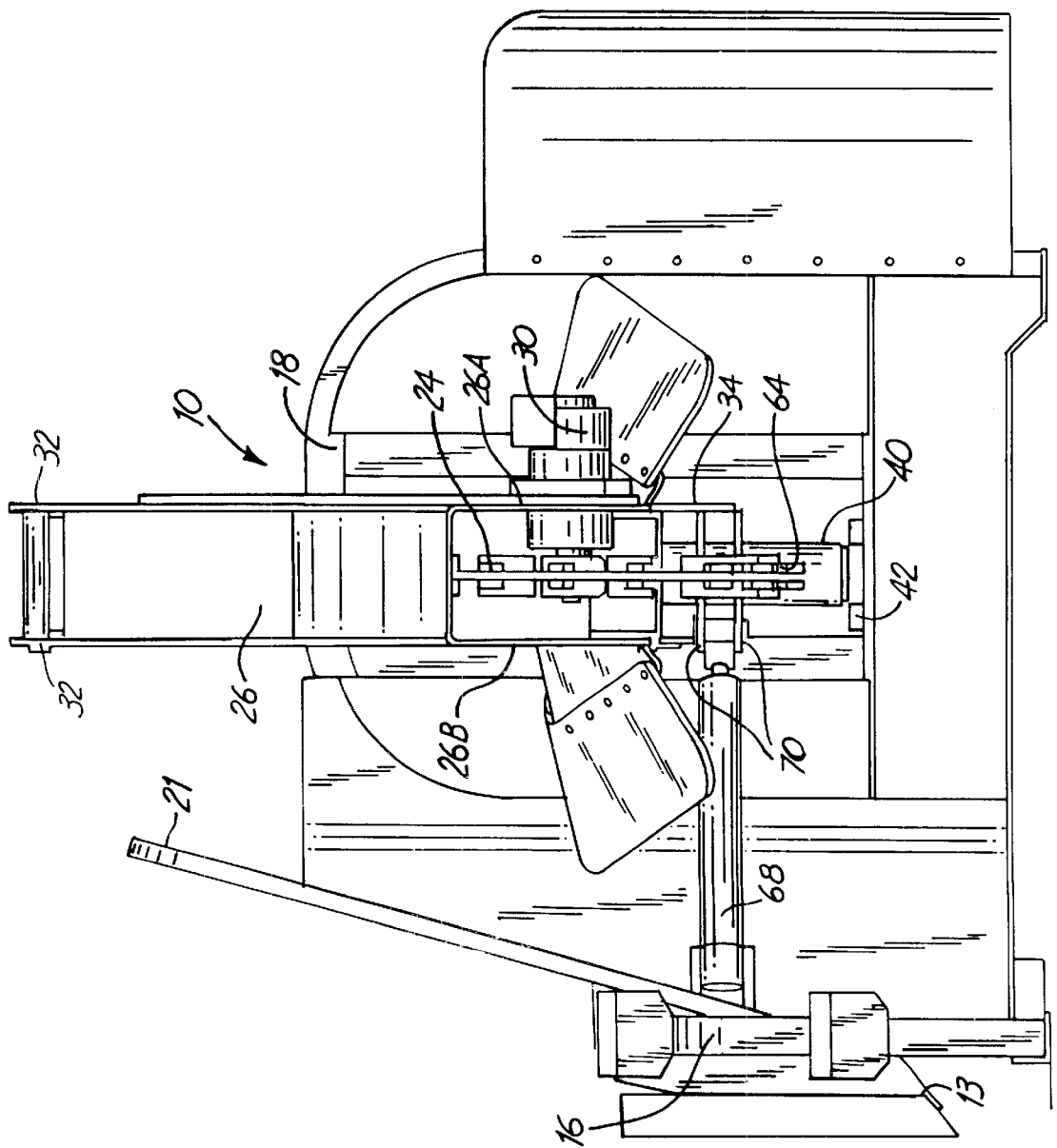
FIG. 3 is a front elevational view of the stump grinder of FIG. 1.
Figure 4:
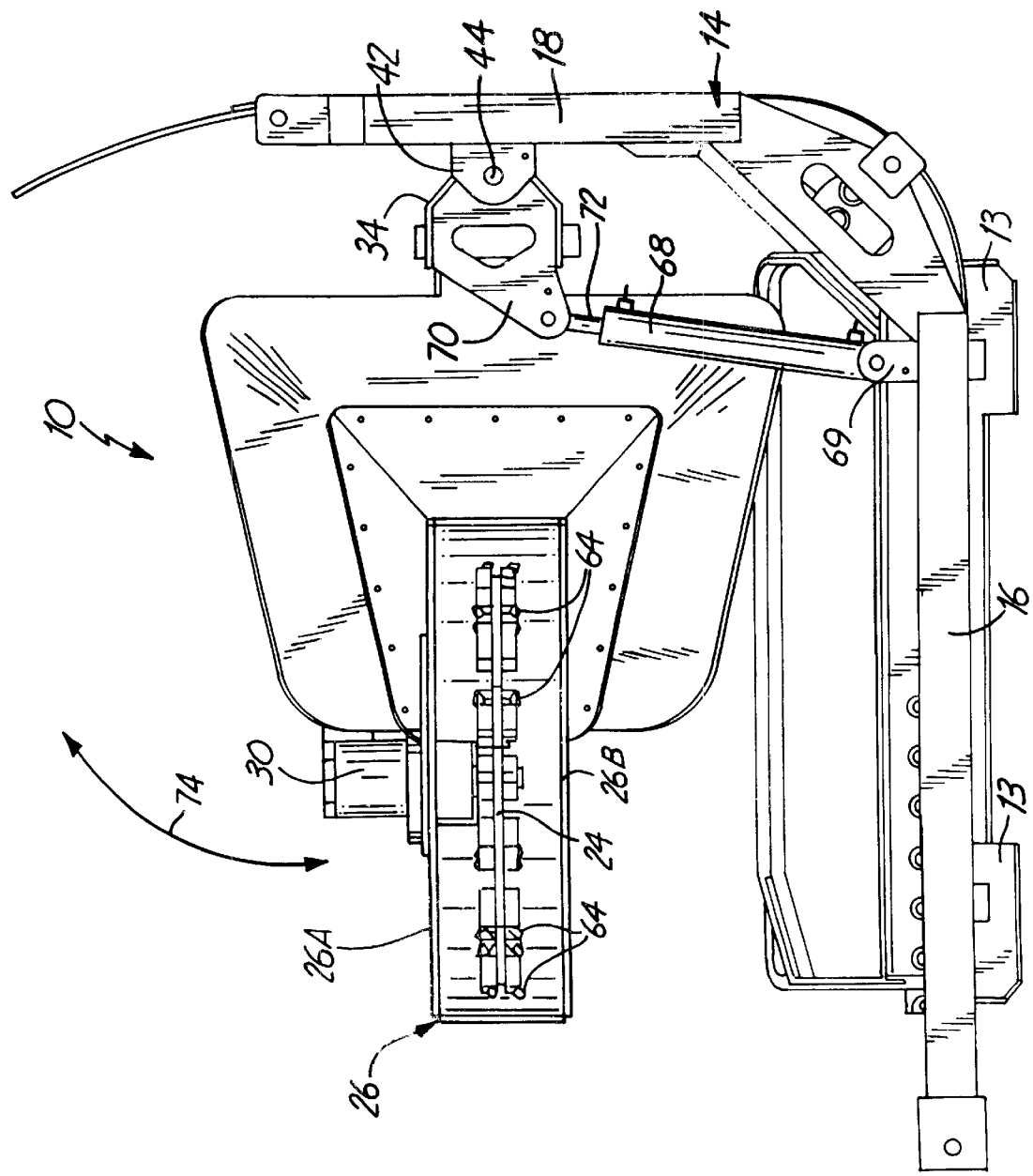
FIG. 4 is a bottom plan view of the stump grinder of FIG. 1.

A stump grinder loader attachment indicated generally at 10 is made to mount onto a loader indicated fragmentarily at 12, with the arms of the loader shown only schematically. The stump grinder has a frame 14, that will attach to a suitable attachment plate on the loader using standard brackets 13 as shown, for connection, and the mounting frame, as can be seen in FIGS. 2, 3 and 4, is "L-shaped" having a mounting panel 16 that carries the brackets 13 that mount onto the skid steer loader 12. The frame includes a forwardly extending frame panel 18 that is integral with the mounting frame panel 16. A suitable screen illustrated generally at 20 can be utilized above the frame portion 16. The screen 20 is shown only schematically, but has an outer frame 21 that would surround suitable screening material.

The stump grinder cutter wheel indicated generally at 24 is mounted in a housing 26 which in turn is mounted on an arm 28. The housing 26 has spaced side walls 26A and 26B and the cutter wheel 24 is drivably mounted on the output shaft of hydraulic motor 30. The motor is mounted on the side panel 26A of the housing 26 and its output shaft extends into the housing. The upper end of the housing 26 forms a pair of support plates 32 that straddle the outer end of arm 28. A pin 34 is used for mounting the housing 26 to the arm 28.

The arm 28 is also pivotally mounted on a bracket 34 which in turn is fixed to a post 40 supported on the frame portion 18. A top mounting plate 36 and a lower plate 42 are supported from the frame 18 and pivotally mount the post 40 about an upright pivot axis. The upright axis of mounting indicated is at 44 in FIG. 1.

The bracket 34 mounts on the post 40, so that the bracket 34, arm 28, housing 26 and wheel 24 all swing with the post 40. Mounting plates 46 are supported on the post 40 above the brackets 34 and mount the base end of a control cylinder 48 that has a rod end mounted with brackets 50 to the arm 28. Upon extension and retraction of the hydraulic cylinder 48, the arm will be raised and lowered so that the cutting wheel 24 can be moved up and down relative to the ground.

The cutting wheel also can be moved about the axis of the pin 38 with a control cylinder 52 that is mounted with brackets 54 to the underside of the arm 28, and is mounted with suitable brackets at its rod end to the housing 26, so that upon extension and retraction of the cylinder 52, the housing 26 and cutting wheel 24 will swing about the axis of pin 38. All of the motions of the housing 26 can be carried out while the cutting wheel 24 is rotating.

The swinging or pivoting of post 40 and thus the cutting wheel is controlled with a hydraulic actuator or cylinder 68, that has its base end mounted to the frame portion 16 with bracket 69, and its rod end mounted to the bracket 34 with a cross feed or swing drive plate 70, perhaps best seen in FIG. 4. The rod 72 of the cylinder 68 is connected to cross plate 70, and as the cylinder 68 is extended and retracted, the wheel 24 will be swept in selected directions as indicated by the double arrow 74 in FIG. 4.

Figure 1:
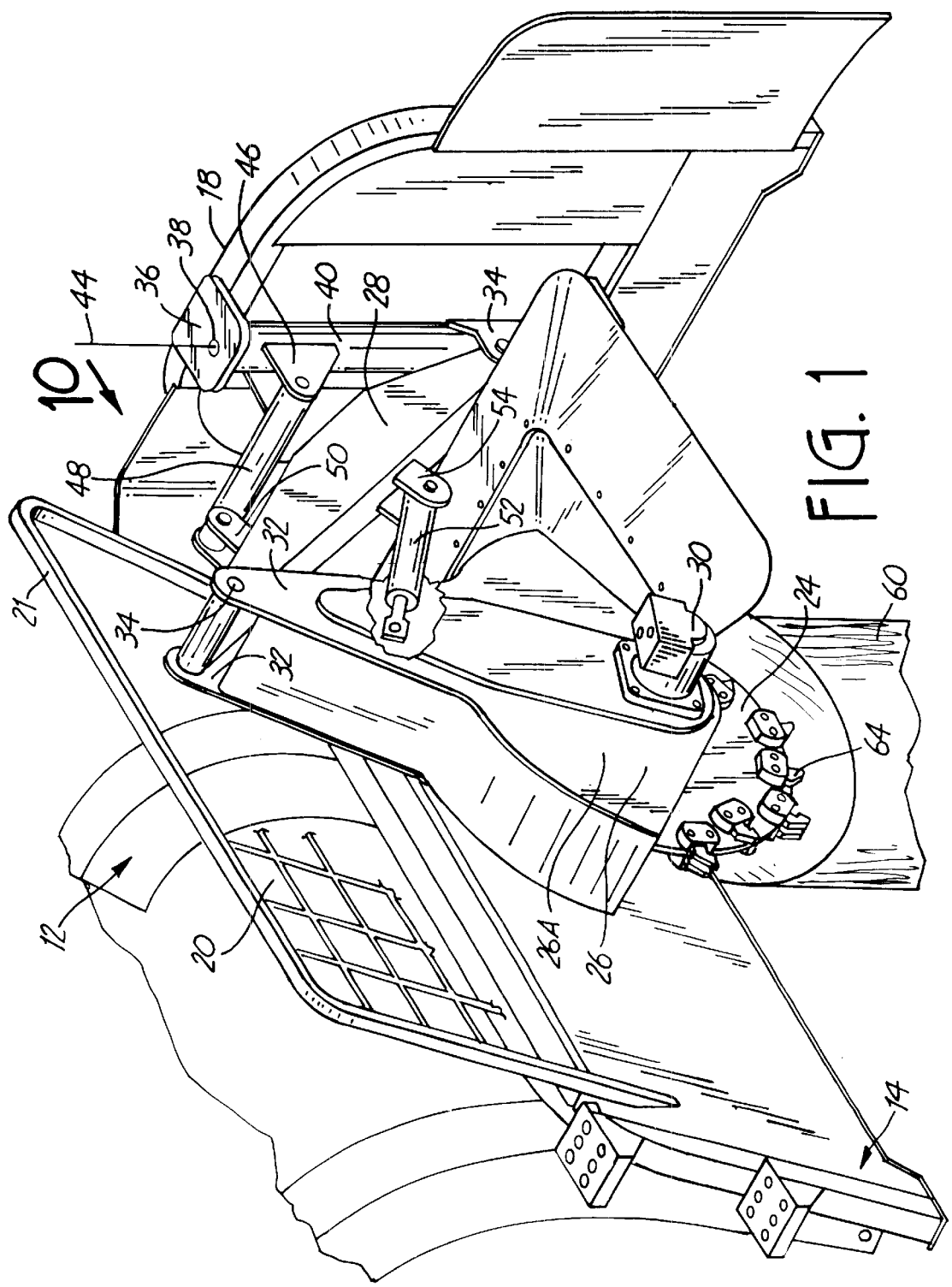
FIG. 1 is a perspective view of a stump grinder made according to the present invention.

The various motions of the stump grinder are used for removing material from a stump, which is generally shown schematically at 60 in FIG. 1.

The cutting wheel 24 has cutter teeth or bits 64 thereon, these bits are used for grinding away material from a stump such as that shown at 60. In the operation, the cutting wheel housing 26, and the wheel 24 are moved about the axis 44 so that when cylinder 68 is operated for swinging or cross feeding the grinder the cutter wheel 24 will be "swept" across the item to be ground or worn away. Whenever the motor 30 is operating, the wheel 24 will be driven.

The rate of cross feed is controlled by the speed of movement of rod 72 of the cylinder 68. In the present invention, the cylinder 68 is connected to pressure responsive proportional flow valves indicated generally at 76 in FIG. 1, that provide a selected output flow in response to the pressure in the motor 30, the pressure signal is from the high pressure side of the motor 30. The motor pressure input 78 acts as a pilot pressure to the proportional valves 76, and as the motor input pressure increases, the flow to the respective side of the actuator 68 is controlled so that it is reduced, as the motor 30 input hydraulic pressure increases.

In this way, the available horsepower is controlled so that as the pressure increases on the motor 30 due to an increased load on the cutter wheel, the rate of feed is decreased to prevent stalling of the hydraulic motor by opening a relief valve 30. The engine of the skid steer loader is operated at a governed, constant speed.

Figure 5:
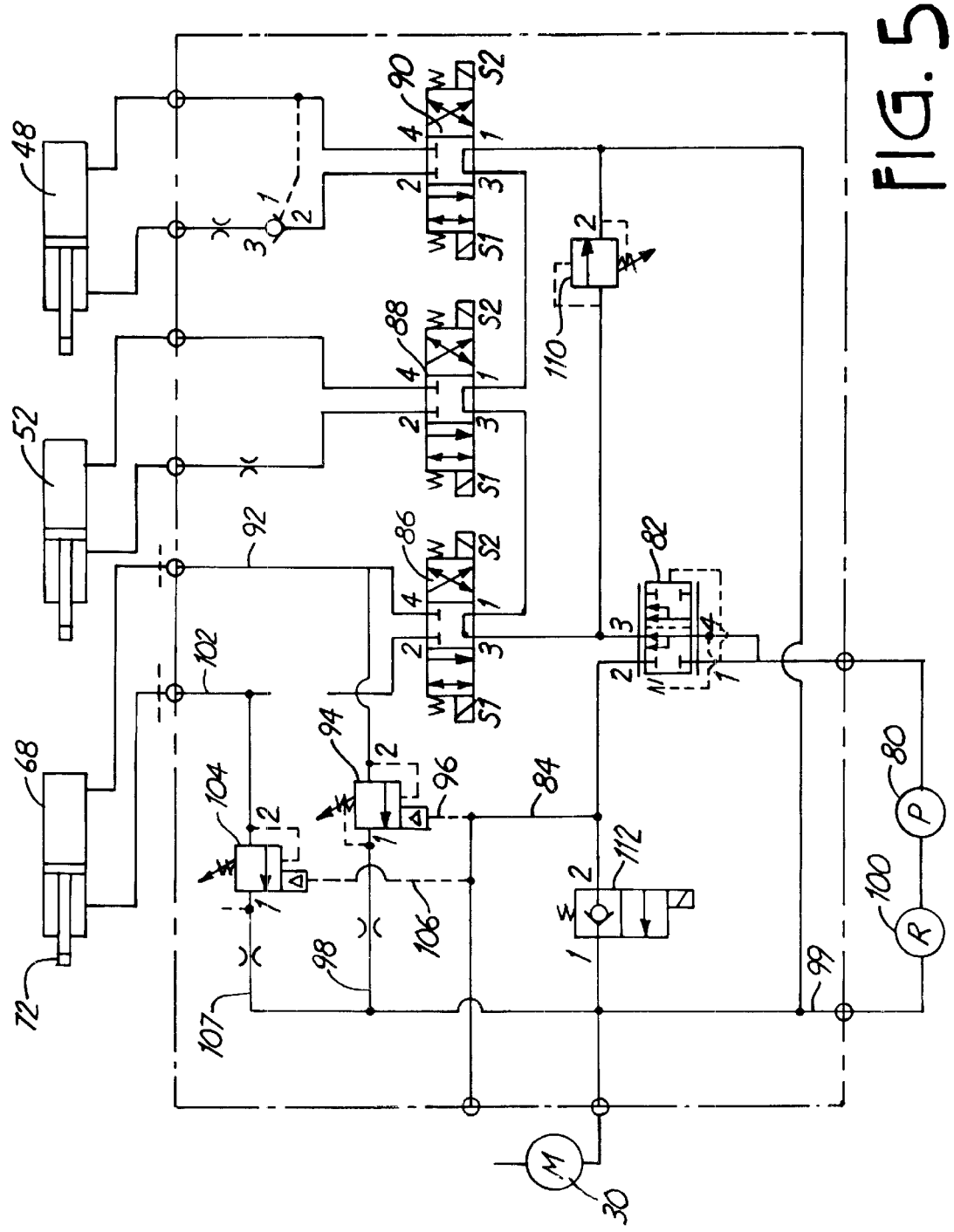
FIG. 5 is a simplified schematic representation of a hydraulic circuit utilized with the present invention.

Specifically, referring to FIG. 5, which is a more detailed hydraulic schematic, a pump 80 is driven by an engine of the loader 12, and provides pressure to a main on/off valve 82. When the valve 82 is on, pressure is supplied to the motor 30 along a line 84, and pressure is also supplied to series connected solenoid valves 86, 88 and 90. Valve 86 is the main valve for the swing actuator 68. Valve 88 is for controlling actuator 52, and valve 90 is for controlling the actuator 42.

These valves 86, 88 and 90 are 4-way operator controlled solenoid valves that permit the double acting cylinders to be controlled for either extending or retracting the respective cylinder rod under pressure. The controls for the actuators 48 and 52 are normal valve controls and are operated when the operator of the stump grinder provides an input.

A pilot operated check valve can be included in the circuit for the cylinder 48, to prevent bleed down and dropping of the housing of the arm 28 and the housing 26.

The valve 86 will control the direction of flow to the swing or cross feed actuator 68, and thus will control the direction of swing of the cutting wheel 24. However, as was said, the rate of movement of the rod 72 of the actuator 68 is a function of the pressure to the motor 30 in the line 84.

The base end of the actuator or cylinder 68 is connected to the valve 86 with a line 92, and a pilot pressure variable output flow or proportional valve 94 is tapped into this line. The pilot pressure side of the valve 94 is also then tapped into the line 84 with a connection 96, so that as the pressure in the lines 84 and 96 increases, the valve 94 will proportionally open from line 92 to a drain line 98, leading back to the reservoir 100 through a main return line 99.

The rod end of the cylinder 68 is connected to the valve 86 with a line 102, and when the line 92 is pressurized by the shifting of the solenoid valve 86 to pressurize the base end of the cylinder 68, line 102 is connected to drain through the valve 86 and return lines on series connected valves 88 and 90.

The cylinder or actuator 68 will be driven in an opposite direction when the cutting wheel 24 is to be swung across the stump in the opposite direction from that directly driven by the base end, and by shifting valve 86 pressure will be provided to line 102. Line 92 will then be connected to drain, and since valve 94 also is connected to drain, the state of valve 94 will not affect the pressure or flow from the base end of the cylinder 68. However, flow in line 102 will be controlled by a second pilot operated variable flow rate or proportional valve 104 that is tapped into the line 102, and has a pilot pressure connection 106 to the line 84. As pressure on the pressure side of the motor 30 increases, that is, the pressure in line 84 increases, valve 104 will proportionally open to drain, and this will also connect the line 102 to the drain line 107 that is connected to the main drain line 99. This will bleed off flow from the cylinder 68 to slow the rate of swing movement of the cutting wheel 24 to avoid stalling the drive motor for the pump 80, which would occur when relief valve 110 opened.

Thus the sensing of the parameter that will control the rate of flow of the cross feed is a pressure signal from the motor 30, and is completely independent of engine speed.

It can be seen that the relief valve 110 is provided in the main circuit. A suitable valve 112 that operates as a normal check valve for the line 84 is a solenoid valve that can be controlled to dump pressure from the valve 82 back to the return line if needed.

Thus, in an all hydraulic system, the feed of the cutting wheel is a function of the pressure in motor 30 needed for rotating the wheel, and where maximum pressure is controlled by a relief valve 110, the variable flow that is dependent upon the pressure in the motor prevents motor stall and opening of the relief valve.

The proportional valves 94 and 104 have built in pressure relief valves, with different settings because of the different effective piston diameters at the rod end of the cylinder and the base end of the cylinder.

The other actuators operated in a normal manner. It also can be seen that orifices can be placed on the drain sides of the pilot operated valves 94 and 104 for flow control.

Although the present invention has been described with reference to preferred embodiments, workers skilled in the art will recognize that changes may be made in form and detail without departing from the spirit and scope of the invention.

What is claimed is:

1. A rotating wheel grinder driven by hydraulic power including a housing for mounting the rotating wheel, a hydraulic motor for driving the wheel in a rotational direction, said motor having a pressure side and a return side, a swinging mount for supporting the wheel for movement about a swing axis, and a hydraulic swing actuator for controlling movement of the swinging mount, and a variable flow valve for controlling flow to a pressure side of the actuator as a function of the pressure on the pressure side of the motor wherein the valve for controlling flow is a pilot operated proportional valve that adjustably connects the pressure side of the actuator to drain as a function of the pilot pressure.

2. The grinder of claim 1, wherein said swing actuator is a double acting actuator, with hydraulic fluid lines connected from a main control valve to a rod end and to a base end of the actuator, and a pilot operated proportional valve connected from each of the lines to drain, and having the pilot inputs connected to the pressure side of the motor.

3. The grinder of claim 2, wherein said housing for said grinding wheel is mounted on an arm, said arm being mounted on the mount for raising and lowering movement about a generally horizontal pivot, and a second actuator for controlling raising and lowering of the arm.

4. The grinder of claim 3, wherein said motor housing is connected to an outer end of the arm about a second horizontal pivot, and a third actuator for controlling the movement of the housing about the second horizontal pivot connection to the arm.

5. A stump grinder attachment for a skid steer loader comprising a frame, a post mounted to the frame for pivotal movement about an upright axis, a support arm pivotally mounted to said post about a first horizontal axis, a first hydraulic actuator for controlling pivoting of the support arm about the horizontal axis, a cutting wheel housing pivotally mounted to the outer end of said arm about a second horizontal axis, and a second hydraulic actuator for controlling pivoting movement of the cutting wheel housing about the second horizontal axis relative to the arm, a cutting wheel mounted in the housing, a hydraulic motor mounted on said housing for driving the cutting wheel about a generally horizontal axis, a third hydraulic actuator for controlling the movement of the post about the upright axis to regulate the lateral feed of the cutting wheel, and a hydraulic control circuit for the third actuator comprising a main control valve that selectively regulates flow of pressure between a rod end and a base end of the third hydraulic actuator, the rod end of the third hydraulic actuator being connected to drain through a first proportional output pilot operated valve, a base end of the third hydraulic actuator being connected to drain through a second proportional output pilot operated valve, and pilot connections for each of the first and second pilot operated valves being connected to the pressure side of the drive motor for the cutting wheel to control the rate of movement of the post about the upright axis as a function of pressure driving the motor.

6. The rotating wheel grinder of claim 1, wherein said actuator is a double acting actuator having two input lines, and at least one of the input lines having a variable flow valve controlling the amount of hydraulic fluid under pressure provided to the actuator on the pressure side of the actuator.

7. The rotating wheel grinder of claim 1, and a frame supporting the mount, said frame being generally L-shaped with two portions joined at ends thereof to form the L-shape.

8. The stump grinder of claim 5, wherein said frame has a first frame portion and a second frame portion that are joined together at respective ends of the frame portions and which frame portions are perpendicular to each other, said first portion being mountable to the skid steer loader to extend generally transverse to the skid steer loader, said second frame portion being laterally offset from the skid steer loader and extending forwardly therefrom, said arm being mounted on said second frame portion at a location spaced from the junction of the first and second frame portions.

9. The stump grinder attachment of claim 8, wherein said third hydraulic actuator is connected to extend between the first frame portion and the arm for controlling movement of the post.

10. A rotating wheel grinder driven by hydraulic power including a housing for mounting the rotating wheel, a hydraulic motor for driving the wheel in a rotational direction, said motor having a pressure side and a return side, a swinging mount for supporting the wheel for movement about a swing axis, and a hydraulic swing actuator for controlling movement of the swinging mount, and a variable flow valve for controlling flow to a pressure side of the actuator as a function of the pressure on the pressure side of the motor and a frame supporting the mount, said frame being generally L-shaped with two portions joined at ends thereof to form the "L" shape.

11. A stump grinder attachment for a skid steer loader comprising a frame, the frame having a first frame portion adapted to extend laterally across the front of the skid steer loader, and a second frame portion fixed to the first frame portion and extending forwardly from the first frame portion, a support arm pivotally mounted to the second frame portion for movement about an upright axis and about a horizontal axis, hydraulic actuators for controlling the pivoting of the support arm about the upright axis and about the horizontal axis, a cutting wheel housing mounted to the outer end of said arm, arm being spaced forwardly of the first frame portion and movable about the upright axis and horizontal axis, and when moved about the horizontal axis, being capable of movement toward the first frame portion, a cutting wheel mounted in the housing, the hydraulic motor mounted on said housing for driving the cutting wheel about a generally horizontal axis extending transversely to the arm while the arm is moved about its upright axis.

12. The stump grinder attachment of claim 11 including a variable flow valve for controlling flow to a pressure side of one of the hydraulic actuators for controlling pivoting of the support arm about the upright axis as a function of the load on the hydraulic motor driving the cutting wheel.

* * * * *